United States Patent
Lee

(10) Patent No.: US 9,333,867 B2
(45) Date of Patent: May 10, 2016

(54) CHARGING STAND FOR ELECTRIC VEHICLE

(75) Inventor: Chung Woo Lee, Cheongju (KR)

(73) Assignee: LSIS CO., LTD., Anyang-si (KR)

( * ) Notice: Subject to any disclaimer, the term of this patent is extended or adjusted under 35 U.S.C. 154(b) by 930 days.

(21) Appl. No.: 13/193,535

(22) Filed: Jul. 28, 2011

(65) Prior Publication Data

US 2012/0025764 A1 Feb. 2, 2012

(30) Foreign Application Priority Data

Aug. 2, 2010 (KR) .................. 10-2010-0074572

(51) Int. Cl.
*H02J 7/00* (2006.01)
*G08B 13/08* (2006.01)
*B60L 11/18* (2006.01)
*B60L 3/12* (2006.01)

(52) U.S. Cl.
CPC .............. *B60L 11/1816* (2013.01); *B60L 3/12* (2013.01); *B60L 11/1825* (2013.01); *B60L 2230/16* (2013.01); *B60L 2250/10* (2013.01); *B60L 2270/32* (2013.01); *B60L 2270/34* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC ............................ Y02T 10/7088; Y02T 90/14
USPC ......... 320/109; 340/540, 540.1, 545.1, 545.2, 340/545.6, 545.7
See application file for complete search history.

(56) References Cited

U.S. PATENT DOCUMENTS

| | | | | |
|---|---|---|---|---|
| 5,250,849 A * | 10/1993 | Periou | .......................... | 307/10.1 |
| 5,900,806 A * | 5/1999 | Issa et al. | ................. | 340/426.25 |
| 6,060,979 A * | 5/2000 | Eichsteadt | ..................... | 340/287 |
| 6,137,096 A * | 10/2000 | Seo | ................ | 219/722 |
| 6,300,123 B1 * | 10/2001 | Vadgama et al. | ........... | 435/287.1 |
| 7,804,274 B2 * | 9/2010 | Baxter et al. | ................... | 320/109 |
| 8,089,747 B2 * | 1/2012 | Storck et al. | ................... | 361/641 |
| 2006/0236326 A1 * | 10/2006 | Aguirre | ......................... | 719/322 |
| 2008/0061962 A1 * | 3/2008 | Campman | ................ | 340/539.13 |
| 2009/0286414 A1 * | 11/2009 | Ohtomo | ........................ | 439/299 |

(Continued)

FOREIGN PATENT DOCUMENTS

KR 10-2009-0002696 1/2009

OTHER PUBLICATIONS

Korean Intellectual Property Office Application Serial No. 10-2010-0074572, Office Action dated Nov. 15, 2011, 4 pages.

*Primary Examiner* — Richard Isla Rodas
*Assistant Examiner* — Michael Dibenedetto
(74) *Attorney, Agent, or Firm* — Lee, Hong, Degerman, Kang & Waimey; Jonathan Kang; Richard Salfelder

(57) ABSTRACT

Disclosed is a charging stand for an electric vehicle, the charging stand including a main body, a door coupled to the main body in such a way as to be opened or closed, and an alarm device generating an alarm if the door is opened, wherein the alarm device has a door sensing unit causing a change in impedance if the door is opened, a controller receiving a signal transmitted from the door sensing unit, and a switching circuit activated by the controller to generate an alarm or store an alarm history, so that the charging stand is advantageous in that the opening of the door can be precisely detected, and the alarm history can be checked later.

3 Claims, 2 Drawing Sheets

(56) References Cited

U.S. PATENT DOCUMENTS

| | | | |
|---|---|---|---|
| 2010/0013433 A1* | 1/2010 | Baxter et al. | 320/109 |
| 2010/0013434 A1* | 1/2010 | Taylor-Haw et al. | 320/109 |
| 2010/0176950 A1* | 7/2010 | Bartholf et al. | 340/572.7 |
| 2010/0279664 A1* | 11/2010 | Chalk | 455/414.1 |
| 2010/0296230 A1* | 11/2010 | Storck et al. | 361/641 |
| 2011/0037429 A1* | 2/2011 | DeBoer et al. | 320/109 |
| 2011/0140656 A1* | 6/2011 | Starr et al. | 320/109 |
| 2011/0174875 A1* | 7/2011 | Wurzer | 235/380 |
| 2011/0187488 A1* | 8/2011 | Fiske et al. | 340/3.1 |

\* cited by examiner

CHARGING STAND FOR ELECTRIC VEHICLE

Pursuant to 35 U.S.C. §119 (a), this application claims the benefit of earlier filing date and right of priority to Korean Patent Application No. 10-2010-0074572, filed on Aug. 2, 2010, the contents of which are hereby incorporated by reference in their entirety.

BACKGROUND OF THE INVENTION

1. Field of the Invention

The present invention relates to a charging stand for an electric vehicle configured to charge a battery of the electric vehicle.

2. Description of the Related Art

Currently, as an electric vehicle is put to practical use, there is a growing demand for a charger for charging the electric vehicle.

The charger for the electric vehicle is typically classified into a quick charger to charge a battery quickly during driving, and a slow charger to charge a battery when it is expected that a vehicle will be parked for a long time.

Such a charger for the electric vehicle includes a main body, a display unit provided on an outer portion of the main body to inform a customer of a charging fee and a charging power, a manipulation unit directly manipulated by a customer to charge the electric vehicle, a wireless communication device installed in the main body to transceive charging data and an electric vehicle history through wireless communication with a database, a control unit controlling various devices, and a power supply unit turning on or off power.

Further, a door is coupled to the main body to take various devices out of the main body or repair, check, and manipulate the devices.

The door is basically installed at the main body in a locked manner. A supervisor can manipulate various devices in the main body after unlocking the door.

However, the currently available charger for the electric vehicle can be operated directly by a driver to charge a battery, so that the charger may be installed in an unmanned way. Further, since it takes a long time for the charger to charge the battery, any person other than a supervisor may arbitrarily open the door to manipulate the devices in the main body or may steal the devices out of the main body.

In order to solve the problems, the door is provided with a mechanical anti-theft alarm device. However, the mechanical anti-theft alarm device is problematic in that it is operated by a push switch, so that it is possible to easily open the door merely by avoiding the push switch. When the alarm device failed, the device cannot generate an alarm, so that it is impossible to know whether the door is opened.

SUMMARY OF INVENTION

Accordingly, the present invention provides a charging stand for an electric vehicle, in which a controller detects whether a door is opened and generates a signal when the door is opened, so that the opening of the door can be precisely detected, an alarm is generated if the door is opened, and a browsing history can be stored and checked.

The present invention is not limited to the foregoing object and other objects will be apparent from the following description.

In one general aspect of the present invention, there is provided a charging stand for an electric vehicle, comprising a main body, an openable/closeable door coupled to the main body, and an alarm device generating an alarm if the door is opened, wherein the alarm device includes a door sensing unit causing a change in impedance if the door is opened, a controller receiving a signal transmitted from the door sensing unit, and a switching circuit activated by the controller to generate an alarm or store an alarm history.

The alarm device further includes a relay turned on or off by the switching circuit, a browsing history record unit recording a door opening history according to an on/off signal of the relay, and an alarm unit generating an alarm in response to the on/off signal of the relay.

DETAILED DESCRIPTION OF THE INVENTION

Figure 1:
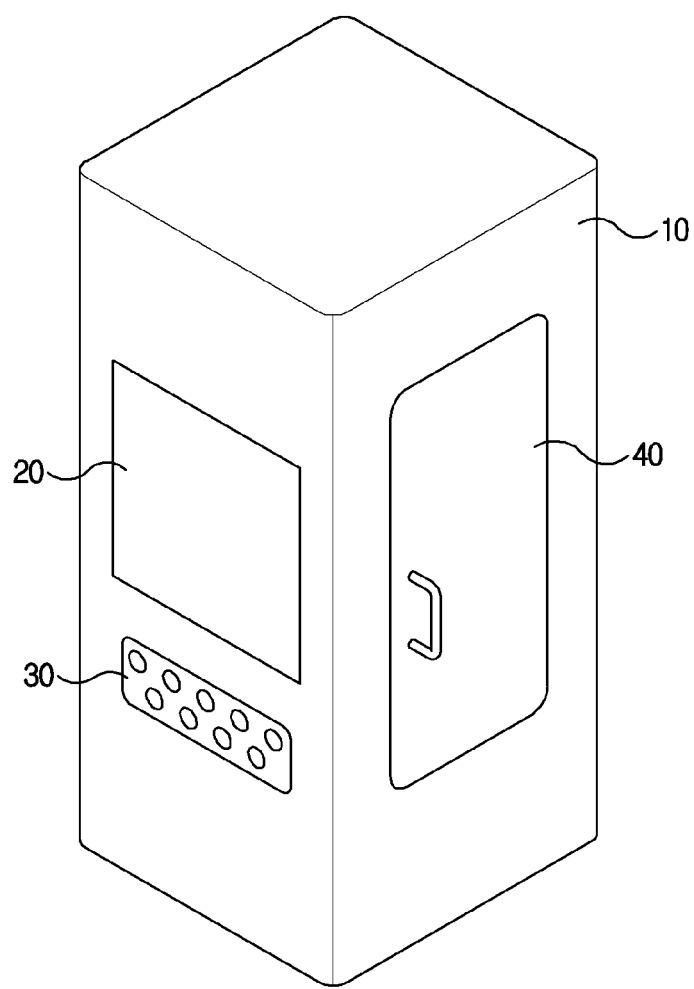
FIG. 1 is a perspective view showing a charging stand for an electric vehicle in accordance with an exemplary embodiment of the present invention.

Hereinafter, exemplary embodiments of the present invention will be described in detail with reference to the accompanying drawings. For clarity and convenience of description, the size or shape of components shown in the drawings may not be illustrated to scale. Further, terminologies defined in consideration of the construction and effect of the present invention may be changed according to a user or operator intention or the custom. These terminologies should be interpreted as having meanings and concepts in keeping with the technical spirit of the present invention based on the overall detailed description.

It will be understood that the terms of "browsing" and/or "door-browsing" means if a door is opened and any information related to various devices in the door has been browsed and/or searched.

FIG. 1 is a perspective view showing a charging stand for an electric vehicle in accordance with an exemplary embodiment of the present invention.

As shown in FIG. 1, the charging stand for the electric vehicle in accordance with the exemplary embodiment of the present invention includes a main body 10, a display unit 20, a manipulation unit 30, and a door 40. The display unit 20 is disposed on a front of the main body 10 to inform a user of a charging fee and a charging amount. The manipulation unit 30 is provided at a position around the display unit 20 so that he or she manipulates the charging amount or the charging fee through the manipulation unit 30. The door 40 is coupled to a side of the main body 10 in such a way as to be opened or closed.

Here, if a touch pad is utilized as the manipulation unit 30, the manipulation unit 30 may be integrated with the display unit 20.

Further, various devices including a control unit and a power supply unit are provided in the main body 10. The control unit functions to control various devices and the power supply unit turns on or off power.

The door 40 is fastened to the main body 10 using a screw or is locked by a separate locking device so as not to be opened by persons other than a supervisor.

When the above-mentioned charging stand for the electric vehicle has a problem or an operation such as the manipulation of the control unit is required, the supervisor opens the door 40 and then manipulates the devices in the main body 10.

The charging stand for the electric vehicle takes a predetermined time to charge the electric vehicle, and is installed outdoors or indoors. Alternatively, the charging stand may be installed in the form of an unmanned device to allow a user to perform a charging operation in person.

However, the charging stand for the electric vehicle has a possibility that general persons other than the supervisor arbitrarily open the door 40 and manipulate the devices in the main body 10. In this case, the configuration of a system may be changed to manipulate a charging fee, or an electric shock or fire may occur.

Therefore, the charging stand for the electric vehicle in accordance with the embodiment of the present invention is provided with an alarm device that generates an alarm when the door 40 is arbitrarily opened and enables a door opening history to be stored and checked.

Figure 2:
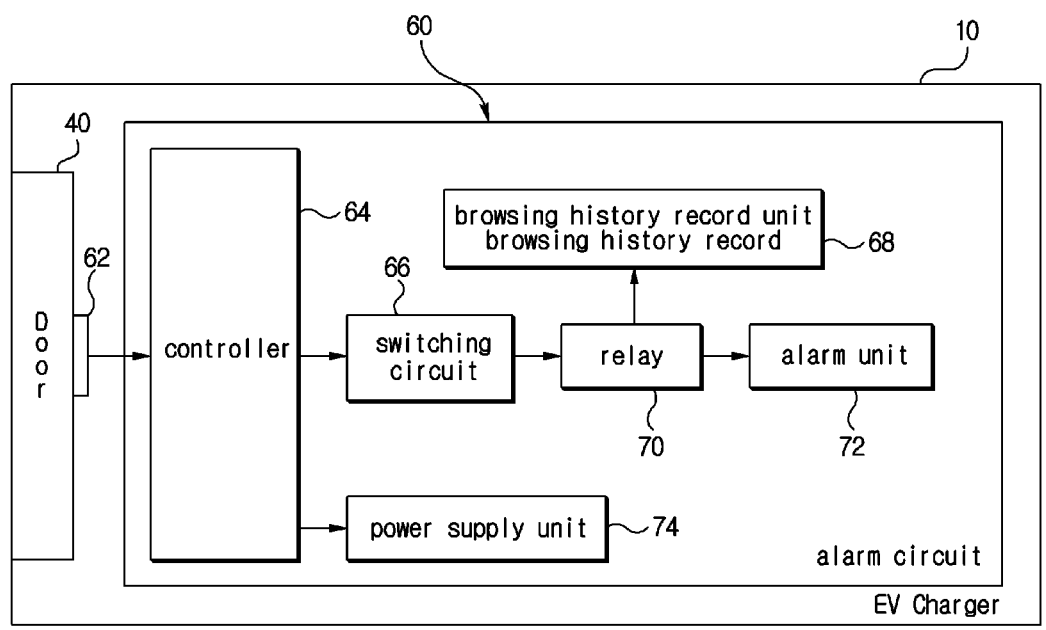
FIG. 2 is a block diagram showing an alarm device in the charging stand for the electric vehicle in accordance with the exemplary embodiment of the present invention.

FIG. 2 is a block diagram showing an alarm device in the charging stand for the electric vehicle in accordance with the exemplary embodiment of the present invention.

Referring to FIG. 2, the alarm device 60 includes a door sensing unit 62, a controller 64, and a switching circuit 66. The door sensing unit 62 is disposed on an inner surface of the door 40 in the main body 10 to generate an electric signal when the door 40 is opened. The controller 64 receives the signal transmitted from the door sensing unit 62. According to the signal transmitted from the controller 64, the switching circuit 66 generates an alarm, shuts off charging power, or records an alarm history.

The door sensing unit 62 is connected to the door 40 via wiring, and the door 40 is made of a non-insulation material. Thus, if the door 40 is opened, impedance is changed. A change in impedance is converted into a change in voltage, so that the controller 64 determines whether the door is opened or not.

Such a door sensing unit 62 may have various structures, for example, a pattern structure, a connector structure, and a wiring structure. That is, as long as disconnection occurs when the door 40 is opened, any structure may be applied to the door sensing unit 62.

The controller 64 activates the switching circuit 66 according to a signal transmitted from the door sensing unit 62, if the door 40 is opened. Further, the controller 64 checks, at a predetermined period, whether the door 40 is opened or not, thus monitoring and storing a precise event record.

The switching circuit 66 turns on or off a relay 70. That is, if the switching circuit 66 is operated, the relay 70 is turned on, so that the opening history of the door 62 is recorded in a browsing history record unit 68, and an alarm unit is operated to inform the supervisor of the opening of the door 40.

Further, the controller 64 controls the power supply unit 74 if the door 40 is opened while the electric vehicle is being charged, thus shutting off charging power and thereby preventing the electric vehicle from being charged. Such an operation is prepared for the case where the door 40 is arbitrarily opened and a charging fee is changed. That is, in this case, charging power is shut off.

An operation of the alarm device of the charging stand for the electric vehicle in accordance with the embodiment of the present invention constructed as described above is as follows.

If a person except for the supervisor arbitrarily opens the door 40, the disconnection of the door sensing unit 62 occurs, thus causing a change in impedance. The controller 64 detects the change in impedance and thereby determines that the door 40 is opened.

Subsequently, the controller 64 activates the switching circuit 66, and the switching circuit 66 turns on or off the relay 70. Thereby, the opening history of the door 40 is recorded in the browsing history record unit 68, and the alarm unit 72 is operated, thus informing the supervisor that the door 40 is opened.

Further, when the electric vehicle is being charged, the controller 64 activates the power supply unit 74 to shut off the charging power.

As described above, the present invention provides a charging stand for an electric vehicle, which is constructed so that a door sensing unit causes a change in impedance if a door is opened, and a controller detects the change in impedance to activate a switching circuit and thereby generate an alarm or store an alarm history. Therefore, the present invention is advantageous in that the opening of the door can be precisely detected, and the alarm history can be checked later.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A charging stand for an electric vehicle, the charging stand comprising:
   a main body;
   a door coupled to the main body;
   a power supply unit configured to provide power to the electric vehicle; and
   an alarm device configured to detect whether the door is open or closed and generate an alarm when the door is opened, the alarm device comprising:
      a door sensing unit configured to cause a change in impedance of a circuit of the alarm device when the door is opened;
      a controller configured to receive a signal transmitted from the door sensing unit;
      a switching circuit configured to be activated by the controller;
      a relay configured to be turned on or off by the switching circuit;
      a history record unit configured to record information related to each occurrence of the door opening according to an on/off signal of the relay; and
      an alarm unit configured to generate the alarm according to the on/off signal of the relay,
   wherein the controller is further configured to:
   shut off the power provided by the power supply unit when the door is opened;
   repeatedly determine a status of the door at predetermined intervals of time;
   cause the history record unit to generate a record for a result of each of the determinations, wherein each record separately comprises the status and time of corresponding determination
   determine each occurrence and a corresponding time of the door opening using each determined status of the door according to an on/off status of the relay.

2. The charging stand of claim 1, further comprising:
   a display unit located on a front side of the main body and concealed by the door when the door is closed, the display unit configured to display a charging fee and a charging amount.

3. The charging stand of claim 2, further comprising:
a manipulation unit located proximate the display unit and concealed by the door when the door is open, the manipulation unit configured to allow a user to manipulate the charging amount or the charging fee.

* * * * *